J. Broughton,
Lubricator.
Nº 51,419.     Patented Dec. 12, 1865.
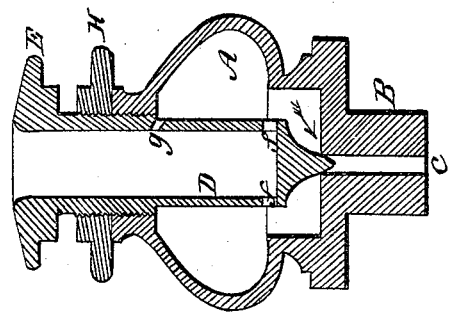
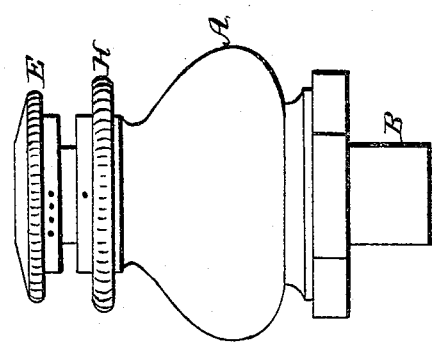
Witnesses.             Inventor.

UNITED STATES PATENT OFFICE.

JOHN BROUGHTON, OF NEW YORK, N. Y.

IMPROVEMENT IN LUBRICATORS.

Specification forming part of Letters Patent No. 51,419, dated December 12, 1865.

*To all whom it may concern:*

Be it known that I, JOHN BROUGHTON, of the city, county, and State of New York, have invented a new and useful Improvement in Open-Top Oil-Cups; and I do hereby declare that the following is a full, clear, and exact description thereof, which will enable others skilled in the art to make and use the same, reference being had to the accompanying drawings, forming part of this specification, in which—

Figure 1 is an elevation of an oil-cup made according to my invention. Fig. 2 is a vertical section.

Similar letters of reference indicate like parts.

This invention has for its object to provide a substitute for the solid-top or open-top oil-cups in general use on the slides of locomotive-engines, which cups now consist simply of a reservoir open at top and provided with a discharge-passage at bottom, cotton-wick or some other porous substance being placed in the bottom for the oil to percolate or filter through. This construction does not provide for controlling or regulating the quantity of oil discharged from the cup, while the cotton or other substance in its bottom diminishes its capacity for holding oil. My invention provides for a perfect control and graduation of the quantity of oil discharged by a very simple arrangement of parts, while the cup may be filled with as much facility as those hitherto used, the top remaining open to the atmosphere and presenting much the same external appearance, and it may be handled or cleaned or stepped upon without becoming displaced or being put out of order.

A is the reservoir or body of the cup; B, the shank by which the cup is attached to the parts to be lubricated. The shank is provided with a central opening, c, for the discharge of oil.

D is a vertical tubular spindle, with a screw-thread on its exterior surface, near its upper end, which screws into the upper end of the reservoir A. The tubular spindle D is enlarged at its upper end to form a head, E, which is milled on its rim. The lower end of the spindle is provided with a solid point, which forms a grinding-valve in connection with the central discharge-passage, c.

f f are lateral openings, two or more in number, for the passage of the oil from the interior of the tubular spindle D to the reservoir A. g is an opening made through the side of said spindle, near the highest part of the reservoir, for the escape of air from the reservoir.

H is a screw-collar or locking-nut, turning freely on the spindle D between its cap and the top of the reservoir.

The operation of the apparatus is as follows: Assuming the tubular spindle D to be screwed down through the upper end of the reservoir A, its lower end will enter and close the central discharge-passage, c. If oil is then poured down the open tubular spindle, it will pass through the lower openings, f, into the reservoir A, the air therein escaping through the upper opening, g. Then, by unscrewing the tubular spindle D, its lower end will be withdrawn more or less from the discharge-passage c, and the oil may thus be allowed to pass into the opening c in any required volume. When the spindle has been unscrewed or elevated to the point required for the desired feed of oil the locking-collar H is run down on the spindle until it comes in contact with the top of the reservoir A, and the spindle is thereby held firmly in the required position.

The dots on the blank fillets of the cap E and collar H are index-marks, showing the amount of graduation of the feed.

The collar H, though it is movable and requires to be slacked up when the spindle D is be operated, will, when screwed down in contact with the upper end of the reservoir, always stop at the same point in relation to the stationary reservoir. Thus the single dot on the collar H answers the purpose of and is equivalent to a stationary point or mark, to which the dots on the cap E may be brought by operating the spindle D.

The object of this device is to enable the operator quickly and easily to replace the spindle D in the exact position required after having withdrawn it for cleaning it out, or for any other purpose.

I claim as new and desire to secure by Letters Patent—

1. The combination of the reservoir A, having a central discharge-passage, $c$, with the open tubular spindle D, when said spindle is provided with openings $f$ and $g$ and a solid pointed end fitting the passage $c$, substantialy as and for the purposes above described.

2. The combination of the locking-collar H with the reservoir A and tubular spindle D, constructed and operated substantially as and for the purpose above described.

JOHN BROUGHTON.

Witnesses:
M. M. LIVINGSTON,
C. L. TOPLIFF.